(12) United States Patent
Strallhofer et al.

(10) Patent No.: US 10,861,624 B2
(45) Date of Patent: Dec. 8, 2020

(54) SENSOR ELEMENT, SENSOR ARRANGEMENT, AND METHOD FOR MANUFACTURING A SENSOR ELEMENT

(71) Applicant: EPCOS AG, Munich (DE)

(72) Inventors: Heinz Strallhofer, Deutschlandsberg (AT); Lutz Kirsten, Deutschlandsburg (AT); Gerald Kloiber, Feldkirchen (AT); Danilo Neuber, Stuttgart (DE); Jan Ihle, Grambach (AT)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 15/327,995

(22) PCT Filed: Jul. 14, 2015

(86) PCT No.: PCT/EP2015/066075
§ 371 (c)(1),
(2) Date: Jan. 20, 2017

(87) PCT Pub. No.: WO2016/012310
PCT Pub. Date: Jan. 28, 2016

(65) Prior Publication Data
US 2017/0162303 A1   Jun. 8, 2017

(30) Foreign Application Priority Data

Jul. 25, 2014 (DE) .......... 10 2014 110 553

(51) Int. Cl.
*H01C 1/14* (2006.01)
*G01K 7/22* (2006.01)
(Continued)

(52) U.S. Cl.
CPC ............ *H01C 1/1413* (2013.01); *G01K 1/08* (2013.01); *G01K 7/22* (2013.01); *H01C 7/008* (2013.01)

(58) Field of Classification Search
CPC ............................ H01C 1/1413; H01C 7/008
(Continued)

(56) References Cited

U.S. PATENT DOCUMENTS 4,712,085 A    12/1987  Miki et al.
4,806,900 A *   2/1989  Fujimori ............... H01C 7/041
                                               338/22 R
(Continued)

FOREIGN PATENT DOCUMENTS

CN          1367497 A       9/2002
CN       101583858 A      11/2009
(Continued)

OTHER PUBLICATIONS

Buttay, C. et al., "Die attach of Power Devices Using Silver Sintering-Bonding Process Optimization and Characterization," IMAPS, High Temperature Electronics Network (HiTen), Oxford, United Kingdom, downloaded on Sep. 11, 2018 on the Internet: URL: https://hal.archives-ouvertes.fr/hal-00672619/document, Jul. 2011, 8 pages.
(Continued)

*Primary Examiner* — William A Bolton
*Assistant Examiner* — Iman Malakooti
(74) *Attorney, Agent, or Firm* — Slater Matsil, LLP

(57) ABSTRACT

A sensor element, a sensor arrangement, and a method for manufacturing a Sensor element are disclosed. In an embodiment, a sensor element includes a ceramic main body and at least one electrode arranged at the main body, wherein the electrode has at least one layer comprising nickel.

19 Claims, 3 Drawing Sheets

(51) Int. Cl.
*G01K 1/08* (2006.01)
*H01C 7/00* (2006.01)

(58) Field of Classification Search
USPC .......................................................... 338/22 R
See application file for complete search history.

(56) References Cited

U.S. PATENT DOCUMENTS

| | | | |
|---|---|---|---|
| 5,319,664 A | | 6/1994 | Nishida |
| 5,760,466 A | | 6/1998 | Masuri et al. |
| 5,805,049 A | * | 9/1998 | Yamada .................. H01C 3/04 |
| | | | 338/22 R |
| 5,886,324 A | * | 3/1999 | Shea .................... H01C 1/1406 |
| | | | 219/505 |
| 5,955,937 A | * | 9/1999 | Groen .................... H01C 7/043 |
| | | | 338/22 SD |
| 6,014,073 A | | 1/2000 | Torii et al. |
| 6,462,643 B1 | | 10/2002 | Fujii et al. |
| 6,498,561 B2 | * | 12/2002 | Lavenuta ................ H04L 67/02 |
| | | | 338/22 R |
| 7,193,498 B2 | | 3/2007 | Kawamoto et al. |
| 7,772,961 B2 | * | 8/2010 | Kinoshita ................ H01C 1/06 |
| | | | 338/22 R |
| 8,092,085 B2 | | 1/2012 | Kawase et al. |
| 8,779,617 B2 | | 7/2014 | Egedal et al. |
| 9,153,365 B2 | | 10/2015 | Hori et al. |
| 9,370,109 B2 | | 6/2016 | Kloiber et al. |
| 2002/0101326 A1 | | 8/2002 | Lavenuta |
| 2003/0128098 A1 | | 7/2003 | Lavenuta |
| 2008/0226927 A1 | | 9/2008 | Kaneda et al. |
| 2009/0316752 A1 | * | 12/2009 | Kawase .................. G01K 7/223 |
| | | | 374/183 |
| 2010/0066482 A1 | | 3/2010 | Shiko et al. |
| 2013/0223479 A1 | * | 8/2013 | Satou ...................... G01K 1/12 |
| | | | 374/163 |
| 2015/0131244 A1 | | 5/2015 | Ballandras et al. |
| 2016/0265979 A1 | * | 9/2016 | Ihle ........................... G01K 7/22 |
| 2017/0219440 A1 | | 8/2017 | Strallhofer et al. |

FOREIGN PATENT DOCUMENTS

| | | |
|---|---|---|
| CN | 101733536 A | 6/2010 |
| CN | 102536670 A | 7/2012 |
| CN | 203708628 U | 7/2014 |
| DE | 10015831 A1 | 4/2001 |
| DE | 10158529 A1 | 8/2002 |
| DE | 102004010713 A1 | 9/2005 |
| DE | 102008036837 A1 | 2/2010 |
| DE | 112011101480 T5 | 5/2013 |
| DE | 112011102074 T5 | 6/2013 |
| EP | 0063455 B1 | 10/1982 |
| EP | 1227308 A1 | 7/2002 |
| EP | 2159556 A1 | 3/2010 |
| JP | H06337229 A | 12/1994 |
| JP | H1183641 A | 3/1999 |
| JP | 2897837 B2 | 5/1999 |
| JP | 2002168702 A | 6/2002 |
| JP | 2002305102 A | 10/2002 |
| JP | 2009270955 A | 11/2009 |
| JP | 2009288023 A | 12/2009 |
| JP | 2010073731 A | 4/2010 |
| JP | 2005340699 A | 12/2015 |
| JP | 6357579 B2 | 7/2018 |
| TW | 201319006 A | 5/2013 |
| WO | 2010055013 A1 | 5/2010 |
| WO | 2014072125 A2 | 5/2014 |

OTHER PUBLICATIONS

Lu, G.Q. et al., "A Lead-Free, Low-Temperature Sintering Die-Attach Technique for High-Performance and High Temperature Packaging," High Density Microsystem Design and Packaging and Component Failure an Analysis, 2004, HDP'04, Proceeding of the Sixth IEEE CPMT Conference, 2004, 5 pages.

Sabbah, W. et al., "Study of die attach technologies for high temperature power electronics: Silver sintering and gold-germanium alloy," Microelectronics Reliability, vol. 53, No. 9, 2013, 5 pages.

Schmitt, W. et al., "Novel Silver Contact Paste Lead Free Solution for Die Attach," Proceedings PCIM Europe, 2010 International Exhibition & Conference for Power Electronics Intelligent Motion Power Quality, May 4-6, 2010, 6 pages.

* cited by examiner

SENSOR ELEMENT, SENSOR ARRANGEMENT, AND METHOD FOR MANUFACTURING A SENSOR ELEMENT This patent application is a national phase filing under section 371 of PCT/EP2015/066075, filed Jul. 14, 2015, which claims the priority of German patent application 10 2014 110 553.2, filed Jul. 25, 2014, each of which is incorporated herein by reference in its entirety.

TECHNICAL FIELD

A sensor element having a ceramic main body is specified. The sensor element may serve in particular for measuring a temperature. For example, the sensor element is an NTC (negative temperature coefficient) sensor element, that is to say a thermistor.

BACKGROUND

The demands on sensor elements, in particular temperature sensors, with regard to long-term durability in aggressive media and usage temperatures necessitate a high level of robustness. At the same time, the sensor element should be inexpensive to produce.

For electrical contacting of the ceramic, metallic electrodes are applied to the main body. Normally, thick-layer electrodes composed predominantly of silver or gold pastes are applied by way of a screen printing process with subsequent burning-in.

SUMMARY OF THE INVENTION

Embodiments of the invention provide an improved sensor element, an improved sensor arrangement and an improved production method for a sensor element.

According to a first aspect of the invention, a sensor element having a ceramic main body is specified. This preferably involves an NTC ceramic. For example, the ceramic has a perovskite structure comprising the elements Y, Ca, Cr, Al, O or a spinel structure comprising the elements Ni, Co, Mn, O. The sensor element is designed in particular for measuring a temperature.

The sensor element has at least one electrode. The electrode is arranged at the main body, in particular on a side face of the main body. It is preferable for two electrodes to be arranged at the main body. For example, a further electrode is arranged on a further side face, in particular on an opposite side face, of the main body. The sensor element is, for example, of cuboidal form. The electrodes are arranged, for example, on a top side and on a bottom side of the main body. Below, one of the electrodes will be described in detail, wherein the description may apply equally to the other electrode.

It is preferable for the entire electrode to be of layered form. The electrode may have multiple layers.

The electrode has at least one layer comprising nickel. The layer may also be composed of nickel.

A nickel-containing layer permits a particularly good mechanical and electrical connection, in particular to the ceramic. For example, low-resistance contact with the ceramic can be realized. Furthermore, a nickel-containing layer permits reliable contacting of the sensor element by way of contact pieces composed of different materials. In this way, a high level of flexibility in terms of usage is realized. For example, an electrode of said type permits the connection of gold-containing, silver-containing, aluminum-containing or copper-containing contact pieces. The material of the contact piece and the material of the electrode, for example, the material of a surface layer, are preferably adjusted to one another. For example, in the case of a gold-containing contact piece, a gold-containing surface layer is used, and in the case of an aluminum-containing contact piece, an aluminum-containing surface layer is used.

The nickel-containing layer is, for example, sputtered. For example, the nickel-containing layer is applied directly to the ceramic of the main body and is thus in direct contact with the ceramic.

In one embodiment, the nickel-containing layer additionally comprises a vanadium fraction. A vanadium fraction may be advantageous for a sputtering process in particular for process technology reasons. For example, vanadium is present with a weight fraction of 7% in the nickel-containing layer. Nickel is present, for example, with a weight fraction of 93%.

The thickness of the nickel-containing layer lies, for example, in the range from 0.3 µm to 10 µm.

In one embodiment, the electrode has at least one sputtered layer. For example, all layers are applied by sputtering. The electrode is preferably free from a burnt-in paste.

In the case of a sputtered electrode, one advantage exists in the relatively low thermal load on the sensor element during the production process, in particular owing to the omission of burning-in of a metallization paste at temperatures of, for example, 700° C.-900° C. Furthermore, a sputtering process permits particularly inexpensive production, for example, because process costs for a burning-in electrode, such as, for example, paste application and drying and the subsequent burning-in, are omitted. Furthermore, a sputtering process permits a broader material selection for the electrode. In this way, greater flexibility is also achieved with regard to material and fastening of a contact element.

The electrode is, for example, a thin-film electrode. For example, the entire electrode has a thickness in the range from 0.3 µm to 30 µm.

In one embodiment, the electrode has multiple layers which are arranged directly one above the other.

For example, the electrode has a lower layer and an upper layer. The lower layer is preferably in direct contact with the ceramic of the main body. The upper layer is, for example, applied directly to the lower layer. Both layers are preferably sputtered. The electrode may also have more than two layers.

For example, the lower layer comprises or is composed of chromium. A chromium-containing layer may be advantageous in particular as an adhesion promoter with respect to the ceramic.

For example, the upper layer comprises or is composed of nickel. The upper layer may additionally have a fraction of vanadium.

In one embodiment, the electrode additionally has a surface layer. The surface layer is the uppermost layer of the electrode and thus forms a termination of the electrode in an upward direction.

That part of the electrode which is situated under the surface layer may also be referred to as an electrode base. This may in particular involve one or more layers.

For example, the surface layer comprises an oxidation-inhibiting metal. In particular, the surface layer comprises at least one material from the group of silver, gold, copper, and aluminum. The surface layer may also comprise tin. The surface layer is preferably sputtered.

By way of the surface layer, corrosion of the electrode, in particular corrosion of a layer of the electrode situated under the surface layer, can be prevented. Furthermore, the surface layer can also improve the mechanical load capacity of the electrode.

Alternatively or in addition to this, the surface layer may be advantageous for contacting with a contact element. In one embodiment, the contact element is fastened directly to the surface layer.

For example, in the case of the connection of a contact element by way of sinter, in particular under pressure at low temperatures, a silver-containing surface layer or a surface layer composed of silver may be advantageous. The contact element is in this case preferably applied directly to the surface layer. In the case of a soldered connection of a contact element, it is, for example, the case that a gold-containing surface layer or a surface layer composed of gold is advantageous. In particular, a migration-resistant connection can thereby be achieved. The solder material is preferably free from silver and free from lead. In the case of a bonded connection, it is, for example, possible for a gold wire to be fastened to a gold-containing surface layer or a surface layer composed of gold.

In one embodiment, the contact element is fastened to a part of the electrode which is partially covered by the surface layer. For example, the surface layer is applied only to a part of the electrode base, such that a part of the electrode base is free from the surface layer. In this case, electrical contacting of the electrode may be realized directly on the electrode base. The surface layer then serves, for example, merely as an oxidation preventer for exposed parts of the electrode base.

For example, the surface layer has a thickness in the range from 0.05 µm to 20 µm. The electrode base, that is to say the rest of the electrode, has, for example, a thickness in the range from 0.3 µm to 10 µm.

In one embodiment, the sensor element has at least one contact element which is fastened to the electrode. It is preferable for two contact elements to be provided which are fastened in each case to one of two electrodes of the sensor element. The contact element is preferably fastened directly to the electrode.

For example, the contact element is in the form of a wire. The wire may be of circular-section form or may be flattened at the connecting point. Furthermore, use may be made of a wire with a rectangular cross section or of a flat strip. The contact element may in this case involve a short wire bridge which serves, for example, for the electrical connection of the sensor element to a connector element. In particular, the contact element may involve a thin wire which is fastened to the electrode, for example, by thin-wire bonding.

It is, for example, possible for the connector element to be arranged on a support, to be part of a support or to be in the form of a support. For example, the connector element is a conductor track on a circuit board, a conductive support of a probe, or a metallization of a support of said type.

It is also possible for the contact piece to be arranged on a support, to be part of a support or to be in the form of a support. In one embodiment, the contact piece simultaneously forms a support for the sensor element or is an integral constituent part of the support. In this case, the electrode of the sensor element is preferably fastened directly to the support, that is to say, without a further, separate contact element. For example, the contact piece is in this case fastened to the electrode by thick-wire bonding.

In one embodiment, the contact piece is in the form of a separate contact element. In particular, the contact piece is not an integral constituent part of a support. The contact piece may be fastened to a support, for example, by welding or bonding.

For example, the contact element is fastened to the electrode by welding or bonding. The contact element may also be fastened to the electrode by soldering.

It has been found that the temperature resistance of the sensor element can be improved by way of these connecting techniques. In particular, the contact point, that is to say the connecting point between contact element and electrode, exhibits good long-term stability. In the case of solder-free, in particular silver-free, constructions, the migration resistance is also improved.

In a further aspect of the invention, a sensor arrangement having a sensor element as described above is specified. The sensor arrangement has a support for supporting the main body. The main body is preferably fastened to the support. The support preferably exhibits sufficient inherent stability to hold the main body in a fixed position, in particular even in different orientations of the support, without a change in shape of the support or a change in the position of the main body occurring.

The support may also, in addition to its function of supporting the main body, serve for the electrical connection of the main body. The support may be of electrically conductive form or may have electrically conductive parts. In particular, the main body may be connected in electrically conductive fashion to the support.

The electrode of the sensor element is connected, in particular electrically connected, to the support, for example, by way of a welded or bonded connection or by sintering. The connection may be direct or indirect.

In one embodiment, the electrode of the sensor element is directly electrically connected to the support. In this case, the above-described contact piece may simultaneously function as a support or form part of the support.

For example, the electrode is connected to the support by bonding, in particular thick-wire bonding, or by sintering.

In one embodiment, the electrode is indirectly electrically connected to the support. In particular, the contact piece is in the form of a separate contact element and is not an integral constituent part of the support. The electrode is in this case connected to the support by way of the contact element. The contact element is connected to the electrode by way of a welded or bonded connection. For example, the contact element may involve a wire, for example, a wire bridge.

In one embodiment, the sensor arrangement is in the form of a probe. The probe is used, for example, for measuring parameters of a flowing medium, in particular a temperature. For example, the probe may be inserted through an opening in the wall of a tube. The support has, for example, a thick, dimensionally stable wire which is connected to the electrode. The wire is, for example, fastened directly to the electrode by thick-wire bonding. Alternatively, the wire may also be connected to the electrode by way of a wire bridge.

In one embodiment, the support is in the form of a circuit board. In particular, the circuit board may have conductor tracks which are electrically connected to the electrodes of the sensor element. An electrode may be connected to a conductor track by way of a contact element, for example, a wire bridge, by welding or by bonding. The sensor element may, by way of a further electrode, be mounted onto a conductor track and fastened to the conductor track. For example, the further electrode may be sintered with the conductor track, for example, under pressure at low temperature.

The sensor arrangement may have an encasement which at least partially surrounds the sensor element. The mechanical fastening of the sensor element to the support may also be realized by way of the encasement.

According to a further aspect of the present invention, a sensor element having a ceramic main body is specified, wherein at least one electrode is arranged at the main body, and wherein the electrode has at least one sputtered layer. The sensor element may have all of the structural and functional characteristics described above.

According to a further aspect of the present invention, a method for producing a sensor element is specified. A ceramic main body is provided, and at least one layer for forming an electrode is sputtered onto the main body. In a further step, a contact piece may be fastened to the sensor element. For example, the contact piece is fastened by welding or bonding.

The present disclosure describes multiple aspects of an invention. All characteristics disclosed with reference to the sensor element, the sensor arrangement or the method are also correspondingly disclosed with reference to the respective other aspects and vice versa, even if the respective characteristic is not explicitly mentioned in the context of the respective aspect.

BRIEF DESCRIPTION OF THE DRAWINGS

Below, the subjects described here will be discussed in more detail on the basis of schematic exemplary embodiments, which are not true to scale.

In the figures.

It is preferably the case that, in the following figures, the same reference signs refer to functionally or structurally corresponding parts of the various embodiments.

DETAILED DESCRIPTION OF ILLUSTRATIVE EMBODIMENTS

Figure 1:
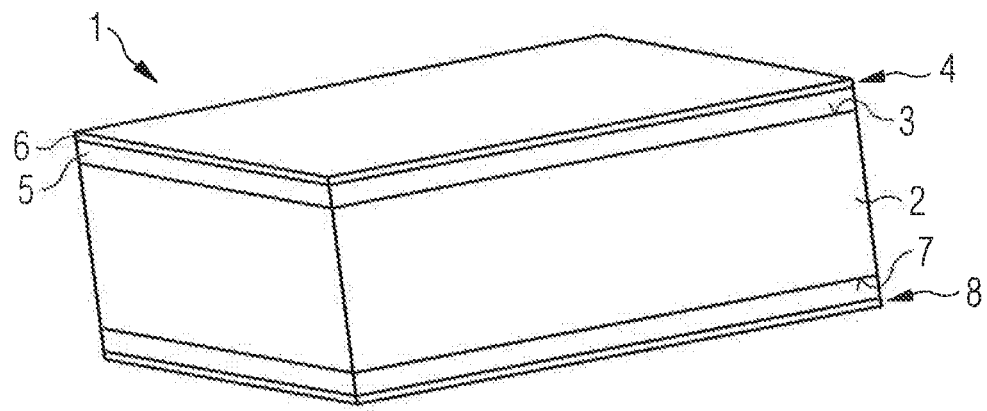
FIG. 1 shows a perspective view of a sensor element.

FIG. 1 shows a sensor element 1, in particular a sensor chip. The sensor element 1 is preferably designed for measuring temperature. The sensor element has a ceramic main body 2. In particular, the ceramic is an NTC (negative temperature coefficient) ceramic. For example, the ceramic has a perovskite structure. In particular, the ceramic may be based on the system Y—Ca—Cr—Al—(Sn)—O, wherein elements placed between parentheses are optionally provided. A sensor element 1 of said type is suitable in particular for high-temperature applications. Alternatively, the sensor element 1 may, in particular in the case of relatively low usage temperatures, have a ceramic with a spinel structure. For example, the ceramic may be based on the system Ni—Co—Mn—(Al)—(Fe)—(Cu)—(Zn)—(Ca)—(Zr)—(Ti)—(Mg)—O.

The sensor element 1 has an electrode 4 which is arranged on a side face 3 of the main body 2. A further electrode 8 is arranged on a further, oppositely situated side face 7. Below, the construction of one electrode 4 will be described, wherein the description may apply analogously to the further electrode 8.

The electrode 4 is a layered electrode with multiple layers 5, 6. The layers 5, 6 are, for example, sputtered. The electrode 4 is preferably designed such that reliable electrical contacting of the electrode 4 is possible by sintering under pressure at low temperatures, by bonding or by welding.

The electrode 4 has a layer 5 which is also referred to as an electrode base. The layer 5 is applied directly to the ceramic of the main body 2. The layer comprises nickel, for example, with a fraction of vanadium, or is composed of said metals.

A surface layer 6 is applied to the layer 5. For example, the surface layer 6 serves as a corrosion preventer for the electrode base, in particular, for preventing oxidation. The surface layer 6 comprises, for example, silver, gold, copper or aluminum, or is composed of one of said materials.

In one embodiment, the electrode base may be of multi-layer form. A lower layer of the electrode base is, for example, in direct contact with the ceramic. The lower layer comprises, for example, chromium, or is composed of chromium. The electrode base may furthermore have an upper layer which is applied to the lower layer. The upper layer comprises, for example, nickel with a fraction of vanadium, or is composed of said metals.

The layer 5 has, for example, a thickness in the range of 0.3 μm to 10 μm. The thickness preferably lies in the range of 0.5 μm to 6 μm. Said thickness may apply both to a single-layer and to a multi-layer electrode base. The surface layer has, for example, a thickness in the range of 0.05 μm to 20 μm.

It is preferable for all layers 5, 6 of the electrode 4 to be applied by sputtering. In this way, it is possible to provide an electrode with increased temperature resistance and with improved long-term stability.

Figure 2:
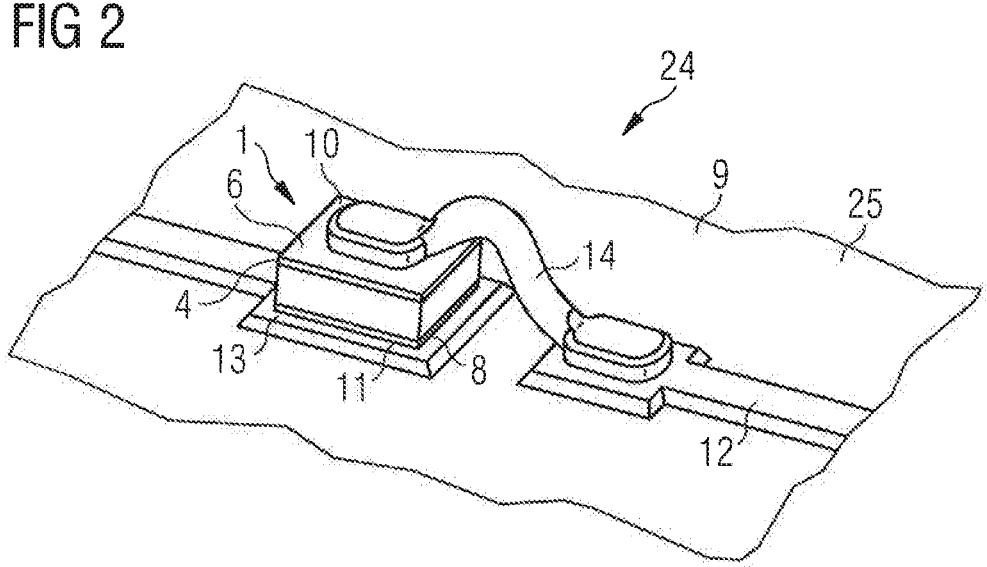
FIG. 2 shows a first embodiment of a sensor arrangement.

FIG. 2 shows a sensor arrangement 24 having a sensor element 1 which is fastened to a circuit board 9. Said construction may be used in particular in the field of power electronics. The sensor element 1 is designed as in FIG. 1.

The circuit board 9 functions as a support 25 for the sensor element 1 and for the electrical connection of the sensor element 1. The sensor element 1 has a top side 10 and a bottom side 11. The sensor element 1 is fastened by way of its bottom side 11 to the circuit board 9. The electrode 4 arranged on the top side 10 is electrically connected to a first conductor track 12, and the further electrode 8 arranged on the bottom side 11 is electrically connected to a further conductor track 13 of the circuit board 9.

The sensor element 1 is, for example, soldered by way of its bottom side 11 to the further conductor track 13. For a migration-resistant connection, which is free from silver and free from lead, by way of soldering, a surface layer 6 comprising gold or composed of gold is advantageous. Alternatively, the further electrode 8 is sintered with the further conductor track 13. For this purpose, it is, for example, the case that a fine-particle silver paste is applied to the conductor track 13 and/or to the further electrode 8. Sintering is performed, for example, under pressure at low temperatures. In this case, the surface layer of the further electrode 8 preferably has silver or is composed of silver.

The electrode 4 on the top side 10 is connected by way of a contact piece 14 to the conductor track 12. The contact piece 14 is fastened to the electrode 4 and/or to the circuit board 9, for example, by bonding. In particular, the contact piece 14 is formed by a wire bridge. The wire is flattened at its ends. In particular, the contact piece involves a thin wire, which may be fastened by thin-wire bonding. It is, for example, the case that a gold wire, an aluminum wire or a copper wire is used. The surface layer 6 of the electrode 4 has, for example, gold.

The contact piece 14 preferably has temperature-stable metals with a low corrosion tendency. It is, for example, possible for precious metals such as, for example, Pt, Au, Ag or semi-precious metals such as, for example, Cu, and also non-precious metals such as, for example, Fe, Ni, or alloys, to be used. Furthermore, the contact piece 14 may also be constructed with different regions having different materials. For example, the contact piece 14 has subregions of different materials. The contact piece 14 may have a metallic wire core and be encased with one or more other metals. The surface of the contact piece 14 may additionally also have a coating such as, for example, a tin coating, a nickel coating etc.

Figure 3A:
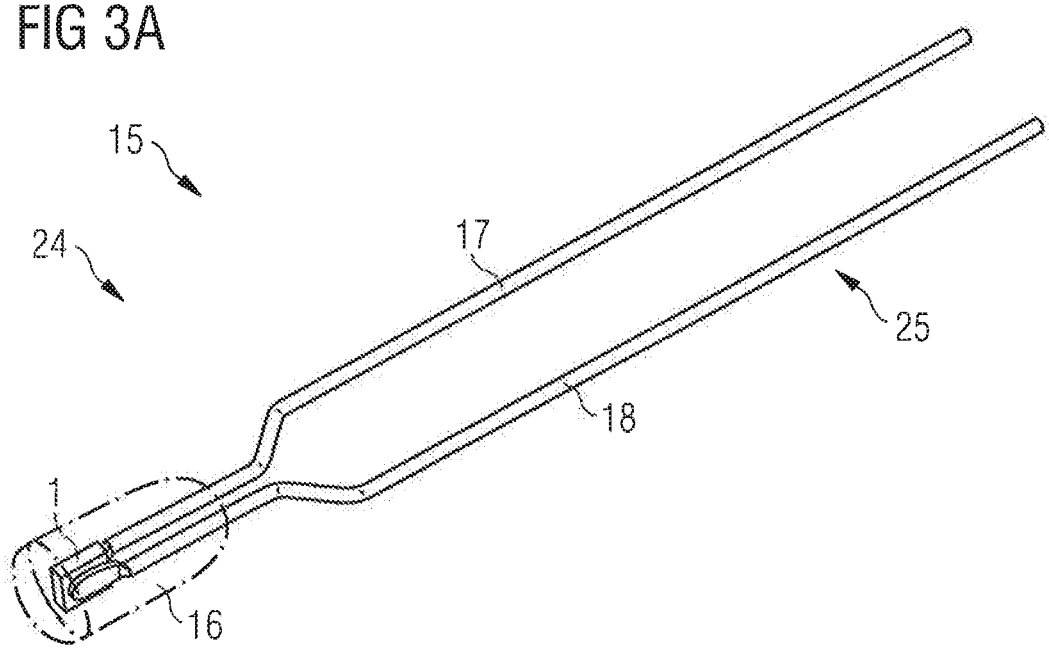
FIG. 3A shows a second embodiment of a sensor arrangement.
Figure 3B:
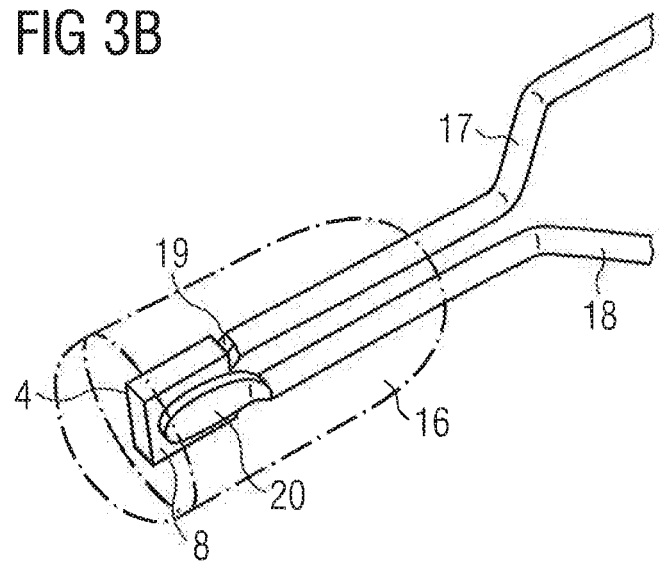
FIG. 3B shows an enlarged detail from FIG. 3A.

FIG. 3A shows a further embodiment of a sensor arrangement 24. FIG. 3B shows an enlarged detail from FIG. 3A. The sensor arrangement 24 involves a probe 15 having a sensor element 1. The probe 15 is, for example, in the form of a temperature sensor. The sensor element 1 is, for example, designed as in FIG. 1.

The probe 15 is of rod-shaped form. The probe 15 is, for example, used for measuring a temperature of a flowing medium. For example, the probe 15 can be inserted through an opening into the wall of a tube.

The probe 15 has a support 25 comprising two support elements 17, 18. The support elements 17, 18 are, for example, in the form of thick wires which can support the sensor element 1 and which exhibit adequate dimensional stability. The support elements 17, 18 are in each case of rod-shaped form.

The sensor element 1 is surrounded by an encasement 16. The encasement 16 can ensure adequate mechanical stability of the probe 15. Furthermore, by way of the encasement 16, protection against external influences is possible, and it is, for example, possible for corrosion of the sensor element 1 by aggressive media to be prevented. For example, the encasement 16 has a polymer or glass. The support elements 17, 18 project into the encasement 16. In particular, the contact points between the support elements 17, 18 and the sensor element 1 are surrounded by the encasement 16.

The support elements 17, 18 also serve for the electrical connection of the sensor element 1. In particular, the support elements 17, 18 are electrically conductive. The ends of the support elements 17, 18 are in the form of contact pieces 19, 20 for the direct electrical contacting with the electrodes 4, 8. The contact pieces 19, 20 form an integral constituent part of the support elements 17, 18. The contact pieces 19, 20 of the support elements 17, 18 are, for example, welded, or fastened by thick-wire bonding, to the electrodes 4, 8.

It is preferably the case that no solder is used for the connection between the support elements 17, 18 and the electrodes 4, 8. In the case of a welding or bonding process, a migration can be prevented, and the reliability of the sensor element 1 can be increased.

The support elements 17, 18 and in particular the contact pieces 19, 20 may, in terms of material and structure, be designed similarly to the contact piece 14 described in FIG. 2. However, the contact pieces 19, 20 together with the remaining part of the support elements 17, 18 exhibit sufficient inherent stability to support the sensor element 1.

Figure 4A:
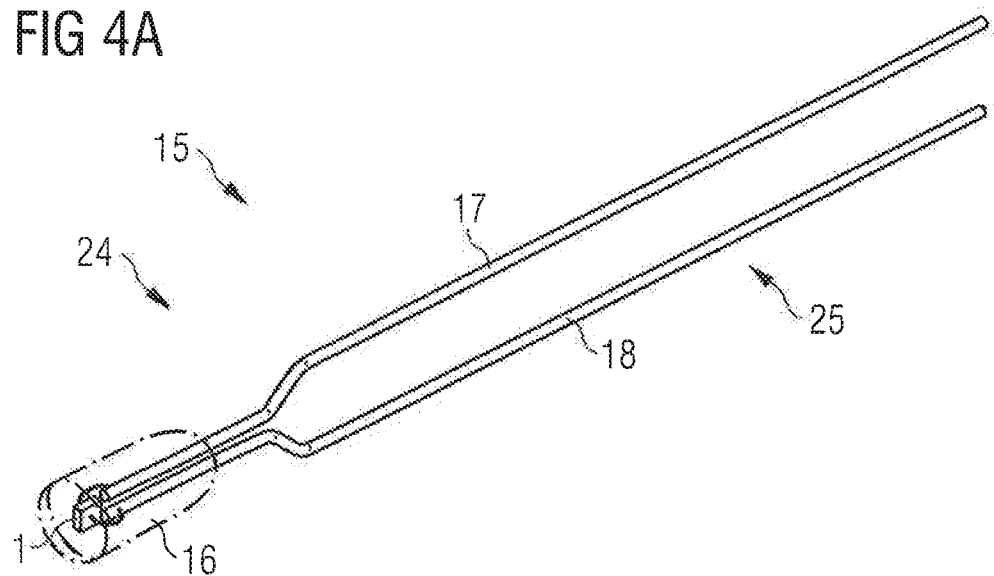
FIG. 4A shows a third embodiment of a sensor arrangement.
Figure 4B:
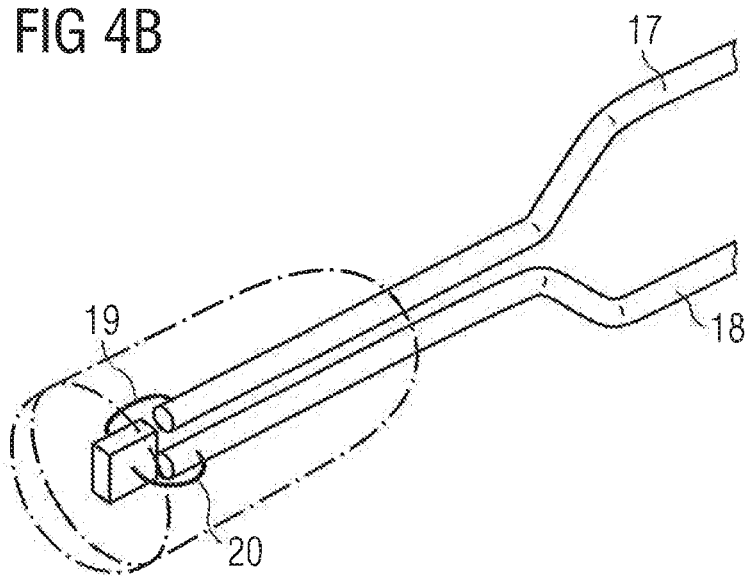
FIG. 4B shows an enlarged detail from FIG. 4A.

FIG. 4A shows a further embodiment of a sensor arrangement 24 in the form of a probe 15. FIG. 4B shows an enlarged detail from FIG. 4A. The sensor arrangement 24 is of similar form to the sensor arrangement 24 from FIG. 3A. However, in the embodiment shown here, the sensor element 1 is not directly fastened to the support elements 17, 18, in particular is not directly electrically connected to the support elements 17, 18. In the present case, the encasement 16 provides the mechanical fastening of the sensor element 1 to the support 25.

Instead, the sensor element 1 is fastened by way of separate contact pieces 19, 20 to the support elements 17, 18. The contact pieces 19, 20 are in the form of wires, in particular bonding wires.

The contact pieces 19, 20 may have the materials as described for the contact piece 14 in FIG. 2. In particular, the contact pieces 19, 20 may have a core composed of a first material and an encasement composed of a second material.

The invention claimed is:

1. A sensor element comprising:
   a ceramic main body; and
   at least one electrode arranged at the main body,
   wherein the electrode has at least one layer including a nickel vanadium alloy comprising nickel and an elemental vanadium fraction,
   wherein the elemental vanadium fraction functioned as a sputtering aid, and
   wherein the vanadium fraction has a small weight fraction of about 7%.

2. The sensor element according to claim 1, wherein the layer is sputtered.

3. The sensor element according to claim 1, wherein the electrode is free from a burnt-in paste.

4. The sensor element according to claim 1, wherein the electrode has multiple layers which are arranged directly one above the other, and wherein a lower layer comprises chromium, and an upper layer comprises nickel.

5. The sensor element according to claim 1, wherein the electrode has a surface layer which comprises an oxidation-inhibiting metal.

6. The sensor element according to claim 5, wherein the surface layer comprises at least one material from the group consisting of silver, gold, copper, aluminum and tin.

7. The sensor element according to claim 5, wherein the surface layer is disposed on the layer comprising nickel.

8. The sensor element according to claim 1, further comprising at least one contact piece fastened to the electrode by welding, bonding or soldering.

9. A sensor arrangement comprising:
   a sensor element according to claim 1; and
   a support for supporting the main body.

10. The sensor arrangement according to claim 9, wherein the sensor element has a first electrode and a second electrode, each electrode having at least one layer comprising nickel, wherein a contact piece is fastened to the first electrode by bonding, welding or soldering, and wherein the second electrode is sintered with the support.

11. A method for producing the sensor element of claim 1, the method comprising:
   providing the ceramic main body; and
   forming the at least one layer of the electrode on the main body, wherein forming the layer comprises sputtering the layer.

12. The sensor element according to claim 1, wherein the electrode comprises a lower layer being in direct contact with a ceramic of the main body, and wherein the lower layer is free from a burnt-in paste.

13. The sensor arrangement according to claim 9, wherein the electrode is connected to the support by sintering.

14. A sensor element comprising:
   a ceramic main body; and
   at least one electrode arranged at the main body, wherein the at least one electrode has at least one layer including a nickel vanadium alloy comprising nickel and a vanadium fraction, wherein the vanadium fraction functioned as a sputtering aid, and wherein the at least one layer is located directly on a ceramic of the main body.

15. The sensor element according to claim 14, wherein the electrode is free from a burnt-in paste.

16. The sensor element according to claim 14, wherein the vanadium fraction has a small weight fraction of about 7%.

17. A sensor element comprising:

a ceramic main body; and at least one electrode arranged at the main body, wherein the at least one electrode has multiple layers which are arranged directly one above the other, wherein a lower layer of the multiple layers comprises chromium and is directly located on a ceramic of the ceramic main body, wherein an upper layer of the multiple layers comprises nickel, and wherein the sensor element is configured to measure temperature.

18. The sensor element according to claim 17, wherein the upper layer comprises a small weight fraction of vanadium content.

19. The sensor element according to claim 1, wherein the at least one layer comprises a small weight fraction of vanadium content.

* * * * *